April 19, 1966     W. W. LOWTHER     3,246,624
PRESSURE INDICATING DEVICE
Filed Feb. 5, 1965
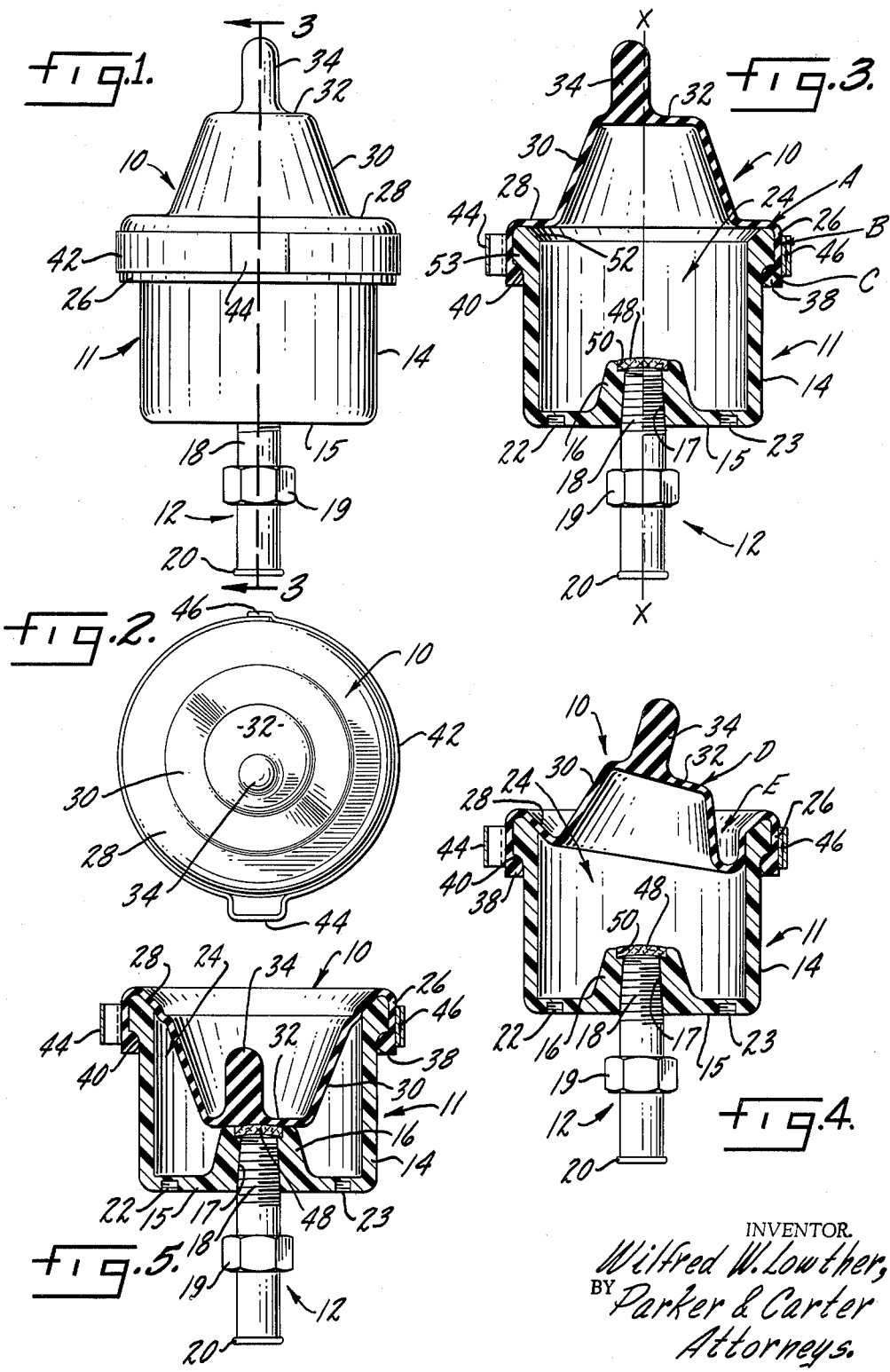
INVENTOR.
Wilfred W. Lowther,
BY Parker & Carter
Attorneys.

United States Patent Office 3,246,624
Patented Apr. 19, 1966

3,246,624
PRESSURE INDICATING DEVICE
Wilfred W. Lowther, Chicago, Ill., assignor to Novo Industrial Corporation, New York, N.Y., a corporation of New York
Filed Feb. 5, 1965, Ser. No. 430,612
9 Claims. (Cl. 116—70)

This invention relates to an indicator unit which reports the condition of an air cleaner in an internal combustion engine, and particularly relates to a unit in which a diaphragm is more easily inverted by the partial vacuum created in the air intake stream of an internal combustion engine when the air intake filter exceeds allowable limits of soiling.

A primary object of this invention is an indicator unit which more quickly reports a soiled condition of the air cleaner so that remedial action may be taken before serious engine damage occurs.

Another object is a service indicator which more sensitively responds to pressure differentials which indicate a soiled air cleaner.

Another object is a service indicator which reports the condition of an air cleaner by inverting a raised diaphragm through sequentially collapsing portions of the raised wall of the diaphragm.

Another object is a service indicator for engine air cleaners in which a raised diaphragm is mounted on a rigid housing, the diaphragm having an offset handle so that a partial vacuum, created in the air intake stream, sequentially collapses the wall of the raised diaphragm.

Another object is a service indicator for an air cleaner of an engine, which indicator operates because of sequential collapse of portions of a raised wall of the diaphragm, which sequential collapse is obtained through placement of a handle at an offset position relative to the axis of the raised diaphragm.

Another object is a service indicator having a diaphragm, a housing, and means to secure the housing in any one of a number of selected vantage points.

Another object is a service indicator with a safety filter to protect the engine in event a defect occurs in a diaphragm of the indicator.

Another object is a diaphragm that is self-locking in service.

Another object is an indicator of the above type which provides a double seal when the unit indicates that the air cleaner needs service.

Another object is an indicator of the above type which will eliminate servicing of the element in the air cleaner when it doesn't need servicing thereby lengthening the usable life of the element.

Another object is an indicator which will indicate when the element in the air cleaner needs servicing so that the operator will not be unnecessarily removing the element and cleaning it.

Another object is an indicator which is of a structure such that it can be manufactured to indicate in accordance with the customer's wishes or its intended service.

Another object is an indicator of the above type which can easily be changed in manufacture to make it more or less sensitive, for example by changing durometer or wall thickness.

The foregoing objects are attained together with other objects which will become apparent from the following disclosure of invention. The invention is illustrated in the attached drawings wherein:

FIGURE 1 is a side elevational view of the service indicator;

FIGURE 2 is a top plan view of the service indicator;

FIGURE 3 is a section along 3—3 of FIGURE 1;

FIGURE 4 is a side sectional view of the raised diaphragm partly collapsed; and

FIGURE 5 is a side sectional view of the raised diaphragm fully inverted.

The use of like numerals in the various views will indicate the same structures and elements.

The service indicator is shown in FIGURE 1 as including a raised diaphragm, shown generally at 10, mounted on a housing, shown generally at 11, and having a line or connection, shown generally at 12, communicating with the interior of the housing.

The housing preferably has a continuous annular side wall 14, a bottom wall 15 having an interior upstanding boss 16 with a threaded aperture 17 to receive the threaded end 18 of connection 12.

The connection is shown as a fitting with a hex portion 19 rigidly fixed thereon to facilitate engagement and removal of the fitting in the threaded aperture 17 of the housing. The lower part of the fitting is preferably provided with means, such as a flange 20, to facilitate communication of the fitting with the air intake stream of the engine. Thus, a flexible tube could be slipped over the flange and the line could be conected to the air cleaner outlet. An opening could be provided in the housing of the air cleaner and the flange 20 of the fitting could be inserted in such opening and properly sealed as with grommets or the like. It is preferred, however, to connect the fitting portion to a line and then communicate this line with the engine air intake stream. In this way, the service indicator unit can be more freely positioned at various vantage points, such as on the dashboard of the vehicle, or on the side of the hood, or on other convenient vantage points. Means may be provided on the housing, such as threaded bores 22 and 23 in the bottom wall of the housing, so that the housing may be mounted by screws or the like to, say, the dashboard of the vehicle. Whereas I have shown threaded holes 22 and 23 for mounting, it should be understood that mounting can take place in any suitable manner.

The housing has an open end, indicated generally at 24, over which is mounted the diaphragm 10. The diaphragm is shown as having the general shape of a truncated cone and includes a skirt portion 26, an inset or shoulder 28, and an inclined continuous side wall 30. A top planar end wall 32 is joined to the continuous side wall and a modified nipple or handle portion 34 is formed on the end wall in an offset position relative to the axis of the diaphragm, indicated generally by line X—X.

The mounting of the diaphragm on the housing may be more securely obtained by providing a continuous annular bead 38 on the interior of the skirt portion, which bead is shown generally as convex. This bead is positioned so that it will be seated against a continuous concave face or groove 40 in the wall of the housing. If desired, a tie-down band 42 may be placed around the skirt portion to additionally secure the diaphragm to the housing. The band may have a loop, as at 44, to permit crimping by an appropriate tool to tighten the band. The illustrated spring band is shown with overlapping ends which are connected as at 46 by means, such as a weld, solder or the like.

The band 42 is not essential and, as a matter of fact, I do not use it at the moment. The skirt 26 leading down to the bead 38 is a stretch fit over the enlargement 53 at the upper end of the housing. Thus, when a pressure differential is first applied to the diaphragm—meaning when the engine is first started—you have an immediate seal at the area designated A, this being the flat horizontal engaging surfaces between the upper end of the housing and the annular portion 28. This is followed by a seal between the side cylindrical surfaces as at B. Third, a seal will be effected at C between the bead 38 and the underside of the enlargement 53. Thus, I provide a triple seal around or between the housing or casing and the outer edge or periphery of the diaphragm. Thus, the clamping band or any sort of pressure squeezing mechanism is by no means essential. The main purpose of a clamping band, such as 42 would be to prevent idle hands from playing with and removing the diaphgram.

The offset position of the handle 34 on the diaphragm, together with the wall structure of the diaphragm and the mounting on the housing, provides a sequential or staggered collapsing or rolling of the diaphragm as it flexes over center. When the pressure differential across the diaphragm caused by an excessive restriction in the intake system is such that the diaphragm tends to flex or be drawn into its housing, the initial movement will be a rolling down of the shoulder or flat portion 28 on the conical surface 52 at the housing entrance. This, in a sense, causes the overall diaphragm to squat. Thereafter, the next movement will be for the truncated portion 30 to collapse and at this point the sequential or staggered movement begins. For example, as shown in FIGURE 4, the right side of the truncated wall, as at E, flows in first since the overall left side of the wall section includes the strengthening offset nipple 34. The action might be described as follows. First, the diaphragm squats. Next, it wiggles as the last portion D rolls through.

The advantage of the wiggle is that the resistance to flexing of the diaphragm is progressively broken down, rather than collapsing all at once. The result is that the diaphragm may start its rolling action overcenter, from the FIGURE 3 position to the FIGURE 5 position, at lower air pressure differentials. The result is that the unit can be made much more sensitive. The truncated structure 30 of the diaphragm can be compared to an arch which will provide a maximum resistance to collapsing. But by positioning the handle 34 offcenter, the arch breaks down progressively, rather than collapsing all at once.

It will be noted in FIGURE 5 that the top end wall 32 hits or rests against or engages the internal boss 16 and filter 48 which limits or defines the maximum inward position. Thus, even though excessive air pressure differentials may be applied to the unit, the diaphragm will be stopped by the boss 16 and will not rupture. Further, the end wall 32 will seal off the filter 48 and inlet 18.

It should be understood that the diaphragm will stay in either position. For example, in FIGURE 5, the diaphragm will stay generally in the position shown even after the air pressure differential has been released. Thus, the operator can observe when the unit has flexed overcenter. Otherwise, when the driver has shut off the engine of his vehicle, the diaphragm might pop back overcenter to the FIGURE 3 form and the operator would not know that the paper element of his air cleaner was loaded with dirt. By the same token, the operator can reach into the diaphragm, in the FIGURE 5 position, and pull it back overcenter to the FIGURE 3 position by grasping the offset handle 34.

If the diaphragm develops a hole or a break, the dirt or foreign matter which might otherwise pass through to the engine will be stopped by the filter 48. Thus, the engine is fully protected. This filter may be a rigid disk of porous, sintered bronze or otherwise. The disk may be frictionally inserted in its seat 50 in the top of the boss 16. The disk is shown as having a slight domed appearance or radius, but it might be otherwise.

The use and operation of my invention are as follows:

It is known that when an air cleaner becomes soiled, especially a cartridge in an air cleaner, an engine pulls harder to maintain the air stream intake to the engine. The pulling action of the engine results in a development of a partial vacuum, and it will be appreciated that if the service indicator commnicates with the air intake stream, then the partial vacum will cause the raised diaphragm to collapse. In order for the service indicator to operate as a single means, it is required that the raised diaphragm remain in a collapsed position to report the fact to an observer. This is accomplished by having the raised diaphragm "pop over," that is, to have the diaphragm turn overcenter and become fully inverted, as indicated in FIGURE 5.

The present service indicator allows the raised diaphragm to "pop over" or become fully inverted under lower pressure differentials; thus, the fact of under-performance of the air cleaner is recorded more quickly. This advantage permits replacement or cleaning of the air cleaner before engine damage occurs as from an intake of grit or other dirt. The more quickly an observer is told that the air cleaner needs replacement, the more likely that remedial action can be taken before serious and expensive engine damage occurs.

The collapse of sequential portions of the continuous side wall 30 leads to a "pop over" or full inversion of the diaphragm with lower pressure differentials. It is believed this occurs from a combination of factors, one certainly being the offset position of the handle 34, and the other the inward angle of the continuous side wall 30. In any event, a lesser vacuum is required to invert the raised diaphragm with the inwardly inclined continuous side wall and the offset handle. The handle itself may be solid or hollow with a chamber which communicates with the area generally enclosed by the continuous side walls of the raised diaphragm.

It is, of course, required that the diaphragm be resilient and, therefore, be made of rubber or equivalent material, and it is preferred that the housing be rigid and constructed of strong material to render it serviceable over extended periods of use. The housing has been shown as being provided with a fitting so that the interior of the housing, which is enclosed by the raised diaphragm, may be brought into communication with the air stream intake to the engine. This fitting has been shown as provided with a flange to facilitate connection to a flexible tubing or the like.

It will, of course, be appreciated that many other means may be provided to connect the unit to the air stream intake to the engine. Various means may also be provided on the housing itself for mounting the housing at a desired vantage point.

The service indicator is preferably provided with a safety filter in the housing which is positioned to filter the connection to the air intake stream of the engine.

One of the advantages of the present unit is that it can be tailored to indicate at any particular restriction the customer desires. For example, a particular customer may want to know when the restriction in the element in his air cleaner has reached 15 inches of water gauge, for example a farm tractor. Or it might be up 30 inches of water gauge, for example on a diesel engine. These are merely examples. Be that as it may, the point is that any particular customer, depending upon the type of engine, air cleaner, and surrounding circumstances, may decide that he wants an indicator which will indicate at a particular restriction peculiar to his situation. This can be easily done by manufacturing my indicator so that it will collapse or pop overcenter at any given pressure differential. The point is that due to the structure of the unit, it can be quickly changed from one form to another so that it will move overcenter and thereby indicate at any selected pressure differential. For example, this can be easily done by varying the durometer of the resilient diaphragm, changing the wall thickness of the material involved, etc. This has the adavntage that the owner will not unnecessarily take the filter element out of the air cleaner and clean it because he doesn't know whether or not it needs servicing. Users are inclined to do this to protect their engine which is an expensive piece of equipment. Thus, over a period of time they will service the element a number of times when it actually doesn't need it. This results in reduced element life. But the present indicator assures the owner and operator that they will only be servicing the element when it actually needs it. Thus, filter element life will be increased.

Another feature is that in the event the filter element in the air cleaner is not serviced and the restriction builds up to, say, something on the order of 30 or 40 inches of water gauge or higher, this will tend to rupture the flexible diaphragm. But note in the FIGURE 5 position that the top wall 32 engages the outlet on boss 16. This acts like a sink stopper and thereafter the side walls 30 of the diaphragm will be protected and not subjected to the increased pressure differential. This also will prevent the safety filter 48 from loading up in the event that a hole or crack does appear in the diaphragm. In other words, once the diaphragm is overcenter, in the FIGURE 5 form, the sealing effect of top wall 32 protects the filter disk 48. When the diaphragm is in its outer position, as in FIGURE 3, if a hole or crack appears in the diaphragm, the filter disk 48 then will protect the engine.

The foregoing invention can now be practiced, and such practitioners will know that the invention is not necessarily restricted to the particular embodiments presented herein. The scope of the invention is to be defined by the terms of the following claims as given meaning by the preceding description.

I claim:

1. An indicator to report a certain restriction condition in an air cleaner for an internal combustion engine, including a housing adapted to be communicated to the air intake stream of the engine downstream from the air cleaner, a diaphragm on the housing open to the atmosphere on one side and subject on the other side to the restriction in the air intake stream of the engine downstream from the air cleaner, the diaphragm being flexible and extending outwardly from the housing in its normal position, but being adapted to flex into the housing when subjected to a certain air pressure differential, the diaphragm being such that it will stay in the housing when the air pressure differential has been released, and a handle on the atmospheric side of the diaphragm of a size and extension such that it easily can be grasped by the user to physically move the diaphragm back to its normal position.

2. The structure of claim 1 further characterized in that the handle is slightly offset from the central axis of the diaphragm.

3. The structure of claim 1 further characterized by and including an outwardly flaring surface at the open end of the housing opposite but normally out of contact with the diaphragm such that the outer periphery of the diaphragm will roll down the flared surface at a certain air pressure differential when the diaphragm begins to flex into the housing.

4. The structure of claim 1 further characterized by and including an upstanding boss generally in the center of the housing projecting toward the open end thereof, an opening through the boss constituting a communication between the air intake stream of the engine and the other side of the diaphragm, the dimensioning and relationship being such that when the diaphragm is fully flexed into the housing, the central portion of the diaphragm will engage the boss and seal off the line of communication.

5. The structure of claim 4 further characterized by and including a filter in the boss across the line of communication to protect the engine in the event of a break in the diaphragm.

6. The structure of claim 1 further characterized by and including a triple seal between the outer peripheral edge of the diaphragm and the open end of the housing.

7. An indicator to report a certain restriction condition in an air cleaner for an internal combustion engine, including a housing with an open end and adapted to be communicated to the air intake stream of the engine downstream from the air cleaner, a diaphragm on the open end of the housing open to the atmosphere at one side and subject to the restriction in the air intake stream of the engine downstream from the air cleaner on the other side, the diaphragm being flexible and extending outwardly from the housing in its normal position, but being adapted to flex into the housing when subjected to a certain air pressure differential, the diaphragm being such that it will stay in the housing when the air pressure differential has been released, and an unbalance in the diaphragm such that it will collapse on one side ahead of the other in response to a certain air pressure differential.

8. The structure of claim 7 further characterized by and including the double seal between the diaphragm and the housing to protect the communication to the air intake stream of the engine.

9. The structure of claim 8 further characterized in that the double seal includes a seal between the exterior of the diaphragm and the housing, and a second seal between the general center of the diaphragm and the communication to the engine effective when the diaphragm is fully flexed into the housing.

References Cited by the Examiner

UNITED STATES PATENTS

| 2,655,894 | 10/1953 | Rabbitt | 116—117 |
|---|---|---|---|
| 2,761,411 | 9/1956 | Pross et al. | 116—34 |

FOREIGN PATENTS 947,211  8/1956  Germany.

LOUIS J. CAPOZI, *Primary Examiner.*